United States Patent
Wenner

[11] 3,883,326
[45] May 13, 1975

[54] SULFUR OXIDES REMOVAL SYSTEM
[75] Inventor: John G. Wenner, Lincolnshire, Ill.
[73] Assignee: Universal Oil Products Company, Des Plaines, Ill.
[22] Filed: Dec. 17, 1973
[21] Appl. No.: 425,471

Related U.S. Application Data
[63] Continuation-in-part of Ser. No. 239,893, March 31, 1972, Pat. No. 3,780,498.

[52] U.S. Cl. .......................... 55/34; 55/73; 55/390
[51] Int. Cl. ............................................. B01d 53/06
[58] Field of Search ............. 55/34, 59, 73, 77, 79, 55/390; 165/7, 10; 23/288 E; 60/90.2, 295, 311

[56] References Cited
UNITED STATES PATENTS
3,780,498  12/1973  Wenner .............................. 55/73

Primary Examiner—Charles N. Hart
Attorney, Agent, or Firm—James R. Hoatson, Jr.; Phillip T. Liggett; William H. Page, II

[57] ABSTRACT

A continuous system is provided for effecting the removal of sulfur oxides from a waste gas stream through the utilization of continuously rotating an acceptor unit, that has a plurality of segmented zones containing an $SO_2$ adsorbent acceptor material, such that at least one segmental zone is always being rotated into the pathway of an $SO_2$ containing waste gas stream while at least one other contacted zone is simultaneously being passed through and into contact with a regeneration stream so as to undergo the removal of sulfur oxides, and a particular embodiment of the system utilizes two stages of rotating beds or units, whereby a first contacted rotating unit serves as a heat exchanger to provide heat regulating exchange with the waste gas stream and the second stage rotating unit serves to effect sulfur oxides removal.

Figure 3:
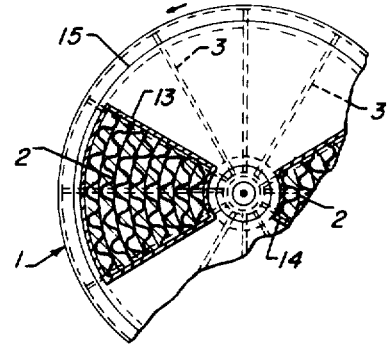

2 Claims, 6 Drawing Figures 3,883,326

SULFUR OXIDES REMOVAL SYSTEM

This application is a continuation-in-part of my previously filed application Ser. No. 239,893, filed Mar. 31, 1972 and now U.S. Pat. No. 3,780,498.

The present invention relates to a method for continuously removing sulfur oxides from a waste gas stream and, more particularly, there is provided a continuous rotating bed system which can obviate the need of a "swing-bed" operation to effect periodic regeneration of an $SO_2$ adsorbing material.

In a more specific aspect, the present invention provides a rotating bed system where two stages of rotating beds are utilized and rotated from a common axial power source, with a first contacted rotating unit serving as a heat exchanger zone to regulate the temperature of the flue gas stream passing along to a second stage sulfur oxides removal zone.

BACKGROUND OF THE INVENTION

The harmful effects to humans and to property caused by the discharge of sulfur oxides into the atmosphere along with flue gases, or other waste gas streams, are generally well known and need not be discussed herein. In any event, because of the harmful aspects of sulfur oxides, there is a need to provide improved, inexpensive methods and means to treat waste gas streams to remove these contaminants. Also, many localities have banned the use of high sulfur content fossil fuels unless flue gas treating steps are combined with the installation.

Actually, sulfur dioxide ($SO_2$) and other sulfur oxides can be removed, or have been removed, from waste gas streams by various processing schemes which have included: absorption, adsorption, wet-scrubbing, chemical reaction with dry acceptors, and related types of techniques. With the use of sorption beds or with acceptor materials, there is the need to have a sorption cycle and a desorption or regeneration cycle, which in turn requires the utilization of a "swing" reactor, or switch-bed operation, in order to provide for the continuous treating of a waste gas stream. The switch-bed system, in turn, requires dual chambers and elaborate valving and timing arrangements to provide a suitable operational unit.

As an alternative to the use of a swing reactor, there can be a moving bed of adsorptive material which can move between a sorption zone and a regeneration zone; however, this type of system can have material handling and material attrition problems.

As still another alternative, the present improved system provides that the solid sorptive material be maintained in a fixed bed on, or within, a rotating disc or cylinder arrangement such that the solid material is in segmented parts of the rotating bed portion of the unit and the material thereby continuously moved alternatively between a waste gas stream and a regeneration stream.

It may be considered a further object and advantage of the present improved system to utilize a two-stage rotating bed arrangement where a first stage bed can be used to add heat or extract useful heat from the incoming contaminated flue gas stream and then pass the suitably heated stream onto the second stage sulfur oxides adsorbing rotating bed. The first stage bed has heat exchange surface suitable to transfer heat to an air stream, or other gaseous stream, while the second stage bed contains activated carbon, alumina, zeolitic molecular sieves, copper oxide, or other suitable $SO_2$ contact material that will alternatively be sorbing or reacting with $SO_2$ and then be subjected to regeneration by rotation into a pathway of steam, nitrogen, carbon dioxide, methane, or other desorbing and/or regenerating gaseous medium.

In a preferred operation, as heretofore noted, there will be an additional gas permeable rotating bed of heat exchange material that is also divided into segmental zones and is also maintained in continuous rotation whereby the waste gas stream is first passed through the heat exchange material to effect a heat exchange prior to being passed into the bed of $SO_2$ adsorbent material. There are thus provided two stages of rotating beds contact material whereby there can be continuous heat exchange and continuous $SO_2$ removal and continuous regeneration of the $SO_2$ contact material. The heat exchange material may be metallic packing, such as screens, tubular members, chevron-type packing, metal meshes and the like. In other words, any suitable material that can readily take on heat and then give up the heat to a second gas stream which is to undergo temperature elevation may be well utilized. Generally, the two rotating bed zones or housings will be in axial alignment and rotate about a common shaft although, in some embodiments, it may be of advantage to have two separate axles which are in longitudinal axial alignment whereby each bed may be rotated separately and at a different rate of rotation. The axial alignment permits a straight-through flow path for the waste gas stream for both rotating beds of the system.

Broadly, the present invention may be considered to provide a continuous method for simultaneously effecting the adsorption or reaction of sulfur oxides from a waste gas stream and the removal of such retained oxides, which comprises, maintaining the continuous rotation of a gas permeable cylinder-form bed of an $SO_2$ adsorbent material that has been divided into segmental zones by gas barrier means, a gas permeable rotating bed of heat exchange material being spaced from and utilized in a series flow combination with said rotating bed of $SO_2$ adsorbent material and providing a segmentally divided zone of heat exchange material in continuous rotation and in the flow path of said waste gas stream whereby such stream is first passed through said heat exchange material to effect a heating thereof prior to being passed into said bed of $SO_2$ adsorbent material, passing the waste gas stream from said heat exchange material continuously into contact with at least one segmental zone of said bed and recovering from an opposing side of such zone a gas stream with reduced content of sulfur oxides, at the same time passing a regenerating gas stream through at least one segmental zone which has accepted the sulfur oxides on said material to effect the substantial removal thereof, and continuing the rotation of said bed through said waste gas and regenerating streams to effect a continuing desulfurization operation.

In an improved method of operation, as well as with respect to a different embodiment of apparatus, there may be the provision of a purge stream inlet and an opposing purge stream outlet connecting to the opposing cover means for each end face of the rotating bed holding the $SO_2$ adsorbent material such that there may be the stripping and purging of any excess undesired stripping medium left within the contact material prior to its being rotated into position for contact with the sulfur oxides containing stream. For example, steam or nitrogen may be utilized to purge a CO₂ stripping gas stream from the adsorptive material after it rotates through the pathway of the regeneration or stripping gas medium whereby there will be the removal of residual stripping gas and sulfur oxides that may still be present in the material prior to the desorbed portion again reaching the pathway of the waste gas stream.

In connection with the heat exchange rotating bed, as well as for the rotating bed holding the adsorbent material for sulfur oxides, there shall be a plurality of suitable radial partitions throughout the depth of each bed in order to provide segmental zones or compartments and to preclude lateral transfer of the gaseous streams throughout the cylinder-form beds. Thus, each bed comprises a plurality of segments precluding lateral gas transfer from one segment to another but will permit gas flow from one face to another and from an inlet duct to an outlet duct which can be placed in fixed opposing positions with respect to each rotating bed. There shall, of course, be cover plate means or end housing which will encase and substantially preclude gas flow through the bed except at those zones where there are opposing passageways and duct means to permit longitudinal flow through a rotating bed. Any leakage of gas flow streams at the zones of passageways and duct means can be precluded by suitable gasket arrangements or "bleed-in" streams of a seal gas. In other words, suitable peripherally located gas inlet arrangements can provide for the bleed-in of steam, nitrogen or other gaseous medium which will, in effect, preclude the outward flow of a waste gas stream or of a stripping or desorbing medium.

In the present application, the terms "SO₂ sorptive material" or "SO₂ adsorptive material" and "SO₂ contact material" are used in a generic manner, inasmuch as the bed may be a true adsorptive material or it may comprise a contact material such as copper oxide on a support which will react with the SO₂ and is sometimes referred to as an "acceptor" material. The latter type of material is thus regenerated by a reducing gas rather than being strictly desorbed; thus, the terms "regenerating" and "desorbing" are also used generically and/or synonomously herein and should not be considered limiting in any way.

Reference to the accompanying drawing and the following description thereof will serve to illustrate diagrammatically the present improved type of desulfurization operation as well as set forth further advantages from the utilization of a combined, two stage rotating bed arrangement resulting in a exchange — exchange-desulfurization system.

Figure 1:
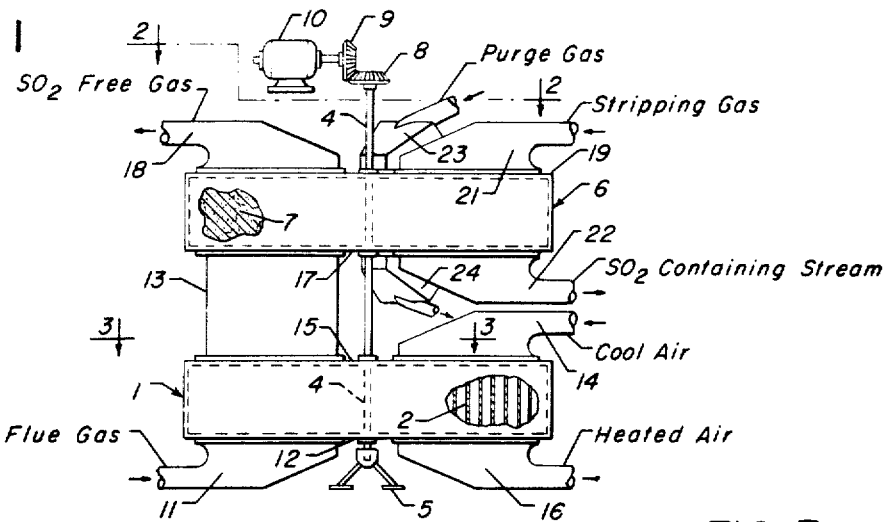

FIG. 1 of the drawing is a diagrammatically elevational view of the present improved two stage system with a lower rotating heat exchange bed and an upper rotating bed containing a sulfur oxides adsorbent material.

Figure 2:
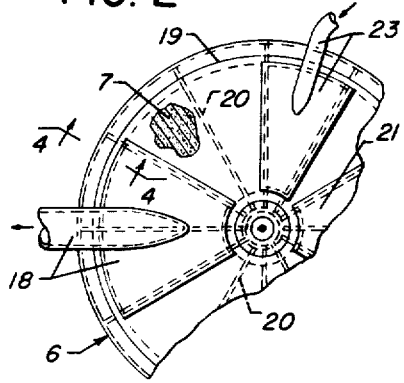

FIGS. 2 and 3 of the drawing are partial plan views, as indicated by the lines 2—2 and 3—3 in FIG. 1.

Figure 4:
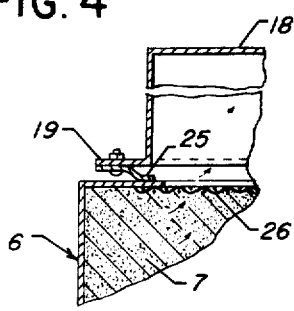

FIG. 4 of the drawing is a partial sectional elevational view through a portion of a gas outlet indicating one means for effecting a seal between a cover means at an edge portion of one of the rotating beds of the unit, such as indicated by line 4—4 in FIG. 2.

Figure 5:
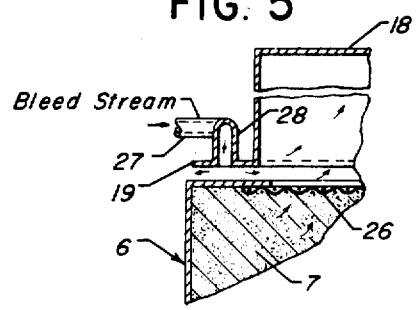

FIG. 5 provides a partial sectional elevational view through an edge of a cover means and an edge of one of the rotating beds of the unit to illustrate the utilization of a bleed stream to preclude the escape of a gas stream being passed through a rotating bed of the system.

Figure 6:
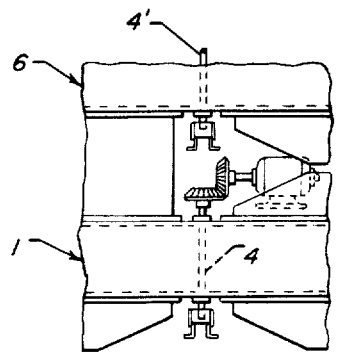

FIG. 6 of the drawing indicates diagrammatically the utilization of separate shaft means for the spaced rotatable beds in the multiple bed system.

Referring now particularly to FIG. 1 of the drawing, there is indicated a lower rotating housing 1 adapted to retain a gas permeable heat transfer material 2 which in turn shall be retained in a multiplicity of segments by reason of the use of a plurality of spaced radial partitions 3 (such as shown in FIG. 3). The rotatable bed or housing 1 is connected, or constructed to rotate, about a suitable axial shaft member 4 which in turn is indicated as being supported from an end bearing support member 5. There is also indicated an upper rotatable housing 6 adapted to retain gas permeable contact material 7. This latter housing is indicated as also connecting to an extended portion of shaft 4, which, in turn, connects through gear means 8 and 9 to motor means 10 such that there is suitable motive power capable of providing for the continuous rotation of each of the contact materials 2 and 7 in the respective housing 1 and 6. As an alternative, and as hereinafter described further, there may be separate motor power means for the respective upper and lower housing whereby there may be different rotational speeds for the two contact beds.

In accordance with the present invention, the lower heat exchange bed, such as 2 in housing 1, will have an inlet duct means 11 connective with cover means 12 such that the incoming SO₂ containing waste gas stream can undergo contact with a heat exchange material 2 prior to passing into a transfer duct 13 and thence into the sulfur oxides adsorbing material 7. For example with an alumina coated with copper oxide as an SO₂ acceptor material, it may be necessary to heat the flue gas to the order of about 750° F. Thus, the heat being transferred to the heat conductive material 2 will, through its continuous rotational movement, give up heat to the waste gas prior to its entering material 7. The heating stream of steam or separate hot flue gases will pass in a separate gas pathway, such as provided by flow between inlet duct means 16 connecting to cover plate means 12 and an opposing gas outlet duct means 14 connecting to cover plate means 15. In other words, heated air or other gaseous stream to give up heat can be introduced in a manner to pass continuously through one or more segments of the heat conducting material 2 and provide a resulting cooled stream leaving duct 14.

As best shown in FIGS. 1 and 3, a cooled stream can be discharged through duct means 14 after passing through heat exchange material 2 and after having entered housing 1 by way of inlet duct 16 while at the same time a regulated temperature waste gas stream enters inlet duct 11 to pass upwardly through a different set of segmental zones of contact material 2 and leave by way of transfer duct 13 for subsequent flow into the sulfur oxides adsorbent material 7. As heretofore noted, various types of materials and arrangements can be utilized as the heat adsorbing material 2 within housing 1 and it is not intended to limit the present invention to any one type of metal or material.

FIG. 3 of the drawing indicates diagrammatically corregated metal strips extending longitudinally from one face to the other for housing 1 whereby there is an extended surface area contact bed 2 with a minimum of pressure drop for the flue gas stream; however, other types of heat exchange packings may well be utilized.

Referring again to FIG. 1 of the drawing and to the second stage of contact as provided by the rotating housing 6 with contact material 7, the waste gas stream from the heat exchange zone or housing 1 will pass by way of duct 13 into bed 7 to be continuously discharged by way of outlet duct 18 from cover plate 19 substantially free of sulfur oxides. It should be pointed out, with particular reference to FIG. 2 of the drawing, that there is a segmental arrangement for the contact material 7 in housing by virtue of a multiplicity of radial partitioning means 20 that will provide a compartmented bed 7 arrangement, in turn precluding lateral transfer of a gas flow stream through the bed from one segment to another, in a manner similar to the arrangement for housing 1. The size or transverse area for each of the duct means 13 and 18 at the respective cover plate means 17 and 19 shall be sufficient in each case to extend over at least one compartment or segment in housing 6 containing contact material 7 to result in the waste gas stream contacting a selected portion of the cylinder-form contact bed 7 as it is continuously rotated through the stream path.

At the same time that the waste gas stream is continuously flowing through the contact material 7, there will be a continuous flow of a gaseous stripping medium through a different selected segmental portion of the contact material 7 as provided by a gas pathway from a gas inlet duct 21 connecting to cover plate means 19 and an opposing outlet duct means 22 connecting to cover plate means 17. By reason of the radial partitioning means 20, the stripping gas stream will, of course, be limited to passage through the one or more segments of bed 7 and housing 6 as may be determined by the transverse area of duct means 21 and 22 as well as the accompanying openings in the cover plate means 19 and 17. It is not intended to limit the present invention to any one particular stripping gas or regeneration medium, inasmuch as carbon dioxide, nitrogen, steam, or other medium capable of effecting desorption of sulfur oxides from the adsorbing medium may well be utilized. On the other hand, with a copper oxide acceptor material in beds 7, then the regeneration gas may comprise a reducing agent such as carbon monoxide, hydrogen and/or a light hydrocarbon such as methane.

Where deemed desirable, there also may be utilized an intermediate purge gas stream to be passed longitudinally through bed 7 and housing 6 at a location with respect to the rotation of bed 7 to follow the stripping gas flow stream, such that residual stripping gas and sulfur oxides can, in turn, be removed from the bed prior to its being again rotated into a position corresponding with the pathway of the waste gas stream from transfer duct 13. Thus, as best shown in FIGS. 1 and 2, an additional duct 23 connecting with cover plate 19 can provide for the transfer of a purge gas stream through bed 7 and housing 6 to an outlet duct 24 extending from cover plate means 17 on the opposing side of housing 6. As with the other ducts connective with housings 1 and 6, each set of inlet and outlet ducts should in each case oppose one another in a manner whereby the gaseous flow stream will pass from one face of the housing to the other in a straight-through, longitudinal manner. Also, the ducts and accompanying passageway means through the various cover plate means shall, in each instance, be sized to extend over at least one segmental portion of an adjacent bed such that there is optimum flow through at least one segmental portion of each bed for each gaseous flow stream. The size of compartments or segments in the bed, as determined by the number of radial partitioning means utilized, shall be determined by the size of a particular rotating bed unit and the quantity of gaseous medium to be handled for sulfur oxides removal, stripping, heat exchange, etc. Actually, the waste gas stream can pass through approximately half of the rotating bed at any one time and the stripping or reducing stream through approximately the other half portion of the rotating bed except for intermediate purge zones as may be required between the adsorption and desorption zones. Similarly, the waste gas stream can flow through approximately half of the heat exchange material 2 in the first stage into housing 1 while the heat exchange stream can pass through the approximate other half portion of the contact material 2, inasmuch as lateral flow will be precluded by the radial partitioning means 3.

In the operation of the two stage system as set forth in my application Ser. No. 239,893, a high temperature flue gas stream above about 200° F. may be at an excessive temperature to provide optimum sulfur oxides adsorption in activated carbon, or other material utilized in bed 7, and the utilization of the heat exchange material 2 in the first stage housing 1 can provide a means for reducing the temperature of the flue gas stream to approximately 200° F. or less. In other words, sufficient heat exchange medium 2 will be provided in a housing 6 to lower the flue gas temperature from whatever its elevated temperature might be down to the level of 200° F. or less. At the same time and in a continuous manner, air can be heated from the heat conducting material 2 by passage of such air stream through another sector of housing 1, such as by the flow path between an inlet conduit 14 and outlet conduit 16. However, as provided by the present system, there may also be a heating of the heat exchange material 2 in order to, in turn, provide an increase in the temperature of the waste gas stream through duct 13 to the $SO_2$ acceptor material 7. For example, a copper oxide on alumina type material may be heated to the 700°–850° F. range, while a vanadium pentoxide material may be in the 600° to about 900° F. range.

It should also be noted that cocurrent flow with respect to contact material 2 is not necessarily required and the flow may well be counter-current with respect to the heated stream entering by way of duct means 14 to pass in a longitudinal flow path through the heat exchange material into duct 16, in lieu of the reverse flow. In a similar manner, there may be a reversal of flow with respect to adsorbent material 7 in housing 6, with the sulfur oxides removing stream being introduced by way of conduit 22 and discharged by way of conduit 21, in lieu of the down flow being indicated in the drawing.

In FIG. 4 of the drawing there is indicated diagrammatically the utilization of a flexible gasket-like seal member 25 between cover plate means 19 and a top rim or edge portion for housing 6 such that gas flow passing upwardly through the bed 7 in housing 6 will not escape between the spacing between cover plate member 19 and peripheral edge portion of housing 6. The seal member 25 may be made in the manner of an asbestos "tadpole" or may be made of suitable temperature resistant plastic type materials, such as teflon, which will minimize fractional resistance when contacting a rim portion of housing 6. It is to be noted that sealing means similar to member 25 shall be utilized around all exterior peripheral portions of all of the cover plate members, such as 12, 15 and 17, as well as plate 19, whereby all principal gas flow streams will be precluded from escaping from the rotating bed system. FIG. 4 also indicates the use of a screen member 26 over the open-end portions of housing 6 to retain the contact material 7 within the plurality of segmented compartments. The size of the screen openings and the screen gauge will, of course, depend upon the type of contact material being utilized in the bed and the flow conditions encountered from the upward flow of a waste gas stream through the unit, as well as from the stripping gas flow. Although not shown, suitable material retaining screen means may also be utilized on suitable spaced support members along a lower portion of the housing 6 to retain the contact material within the bed 7 and within each of the plurality of segmented compartments of the housing 6.

In an alternative arrangement, there is indicated in FIG. 5 of the drawing the utilization of a bleed stream to prevent principal gas stream losses from the unit at zones between the various opposing gas duct means, the cover plate means and the end portions of the rotating housings. Specifically, there is indicated diagrammatically the utilization of a bleed stream inlet means 27 connective with a peripheral bleed passageway 28 in cover plate means 19 whereby there can be a continuous introduction of steam, nitrogen or other inert medium into the peripheral space between cover plate 19 and the edge portion of housing 6 to result in a prevention of outward flow from a waste stream path to duct 18. In a similar manner, peripheral bleed stream inlets and passageways around all cover plate means and/or duct means can provide for bleed-in flows to preclude loss of flue gas or air stream flow through housing 1, as preclude losses with respect to stripping and purge gas stream flows passing through housing 6. It is to be noted that the use of gasket means and bleed-in stream means are well known systems for effecting sealing means for this type of apparatus and it is not intended to limit the present two stage system and two stage apparatus arrangement to the utilization of any one sealing means to contain the principal gas stream flow paths.

It is believed that by suitable sizing of housings that it is possible to have housings which rotate at the same speed, whereby both housings can be connected to a common rotatable shaft 4 or rotated about a shaft means at the same rate from a single motive power source. In the event that it is desired to have separate rates of rotation for the two different housings then, as indicated in FIG. 6, separate shaft means 4 and 4' may be utilized for effecting the movement of the respective housings 1 and 6. In other words, shaft means 4 and 4' will have separate bearings and support means and separate motive power means to effect the rotation of the respective housings. Further, although not shown, it is within the scope of the present invention to have power means adapted to connect with the peripheral portions of the respective rotating housing means 1 and 6 whereby such housings rotate about axles or shaft members 4 or separate axle members 4 and 4'. There are various methods to construct and support the housing means, as well as the duct means in connection therewith, for both the heat exchange bed and sulfur oxides adsorption beds and such construction means will be obvious to those skilled in the art of building chambers and duct work. In other words, it is not intended to limit the present invention to any one method of construction or to any particular type of materials in providing the successive stages of rotating bed contact, i.e., a heat exchange material in a first rotating bed and a sulfur oxides removal material in a next successive rotating bed.

I claim as my invention:

1. A continuous method for simultaneously effecting the adsorption of sulfur oxides from a waste gas stream and the removal of such oxides which comprises maintaining the continuous rotation of a gas permeable cylinder-form bed of a $SO_2$ adsorbent material that has been divided into segmental zones by gas barrier means, a gas permeable rotating bed of heat exchange material being spaced from and utilized in a series flow combination with said rotating bed of $SO_2$ adsorbent material and providing a segmentally divided zone of heat exchange material in continuous rotation and in the flow path of said waste gas stream whereby such stream is first passed through said heat exchange material to effect a heating thereof prior to being passed into said bed of $SO_2$ adsorbent material, passing the waste gas stream from said heat exchange material continuously into contact with at least one segmental zone of said bed and recovering from an opposing side of such zone a gas stream with reduced content of sulfur oxides, at the same time passing a regenerating gas stream through at least one segmental zone which has adsorbed sulfur oxides on said material to effect the substantial removal thereof, passing a high temperature gaseous stream into contact with said gas permeable rotating bed of heat exchange material through a portion of said rotating bed that is spaced from the pathway of the waste gas stream whereby the latter is heated and said high temperature gaseous stream is cooled down from contact with said heat exchange material, and continuing the rotation of said bed through said waste gas and regenerating streams to effect a continuing desulfurization operation.

2. The continuous method of claim 1 still further characterized in that the speed of the rotating bed of heat exchange material and the quantity thereof is correlated with respect to the temperature and flow rate of the waste gas stream to raise its temperature to suit said $SO_2$ adsorbent material.

* * * * *